(12) United States Patent
Choy et al.

(10) Patent No.: US 7,777,367 B2
(45) Date of Patent: Aug. 17, 2010

(54) SEQUENTIAL SHUNT SOLAR ARRAY CONTROLLER

(75) Inventors: Winnie W. Choy, Cerritos, CA (US); Ich D. Ngo, Monterey Park, CA (US)

(73) Assignee: The Boeing Company, Chicago, IL (US)

( * ) Notice: Subject to any disclaimer, the term of this patent is extended or adjusted under 35 U.S.C. 154(b) by 213 days.

(21) Appl. No.: 12/099,376

(22) Filed: Apr. 8, 2008

(65) Prior Publication Data

US 2009/0251004 A1 Oct. 8, 2009

(51) Int. Cl.
*H02J 1/04* (2006.01)
*G05F 1/00* (2006.01)

(52) U.S. Cl. .......................................... 307/60; 323/272
(58) Field of Classification Search ................... 307/60; 323/272

See application file for complete search history.

*Primary Examiner*—Albert W Paladini
*Assistant Examiner*—Hal I Kaplan
(74) *Attorney, Agent, or Firm*—Yee & Associates, P.C.; Clifford G. Cousins

(57) ABSTRACT

A current controller for a spacecraft comprises ripple regulators and a pulse width modulated regulator. Ripple regulators receive current from associated current sources and pass current to or shunts current away from the bus. The pulse width modulated regulator receives current from another current source and passes a portion of the current to the bus. This regulator varies its set point to float between ripple regulators passing current and the ripple regulators shunting current and adjusts a portion of current that is shunted away from the bus. The current shunted by the regulators form a total shunt current. The variable set point of the pulse width modulated regulator varies as the total shunt current varies. The ripple regulator set points do not vary in this manner. An error generation circuit generates an error that adjusts the ripple regulator and the pulse width modulated regulator to a desired bus voltage level.

16 Claims, 4 Drawing Sheets

SEQUENTIAL SHUNT SOLAR ARRAY CONTROLLER

BACKGROUND INFORMATION

1. Field

The present disclosure relates generally to controlling a power source and in particular to a method and apparatus for controlling current to a load. Still more particularly, the present disclosure relates to a method and apparatus for regulating a voltage on a bus having a plurality of parallel power sources.

2. Background

Spacecraft are vehicles or devices designed for space flight or use in space. Spacecraft may be used for various purposes such as, for example, communications, earth observation, metrology, navigation, planetary explanation, and other suitable uses. A spacecraft has various subsystems that may vary depending on the particular purpose of the spacecraft. Spacecraft systems may include attitude determination and control, guidance, navigation, communications, command and data handling, thermal control, propulsion, and power.

With respect to power, electrical power generation and distribution is required in a spacecraft. One typical power generation system is solar array. A Solar array consists of single or multiple solar panels which have a surface area that can be controlled to point towards the sun as a mechanism moves. More exposed surface area means that more electricity may be converted from light energy. A solar panel typically consists of multiple solar circuits. A solar circuit is a group of solar cells connected in series.

A solar array may charge a battery or directly power the spacecraft load. In some configurations, multiple solar circuits are connected in parallel such that parallel current sources are present. A solar array may be connected to multiple power regulators such that current can be directed to the load or diverted away from the load by shorting out solar circuits and return the current back to the solar array.

Controlling solar array current on a spacecraft in this manner is required to maintain a regulated bus. With a regulated bus, solar current is provided to satisfy the demand of a load. Excess current from the solar array is not used. Control circuits may be used to sequentially divert current away from different solar circuit groups to meet load demand.

Currently existing controller systems may use multiple pulse width modulated (PWM) regulators to totally pass, partially pass, or totally shunt excessive current as needed. These types of regulators, however, are complex and heavy. Weight is often a critical factor in designing spacecraft. For example, with a satellite, a target weight may be set for a particular satellite design. Efforts are made to reduce the weight for as many components as possible to meet the target weight for the design.

Therefore, it would be advantageous to have improved method and apparatus to overcome the problems described above.

SUMMARY

The advantageous embodiments provide a method and apparatus for controlling power passed to a bus. In one advantageous embodiment, a current controller comprises a set of ripple regulators, a pulse width modulated regulator, and an error generation circuit. The set of ripple regulators are capable of receiving current from current source and passing the current to the bus, wherein each of the set of ripple regulators has a different set point at which the current is diverted from the bus to form a number of set points. The pulse width modulated regulator is capable of receiving a current from another current source and passing the current to the bus, wherein the pulse width modulated regulator has a variable set point used to define a portion of a current source that is shunted away from the bus, wherein the current shunted by the set of ripple regulators and the current shunted by the pulse width modulated regulator form a total shunt current, wherein the variable set point varies as the total shunt current varies, and the number of set points do not vary as the total shunt current varies. The error generation circuit is capable of generating an error control signal, wherein the set of fixed set points and the variable set point may be adjusted by the error control signal.

In another advantageous embodiment, an apparatus comprises a set of fixed regulators and a variable regulator. The set of fixed regulators is capable of being connected to a set of current sources, wherein each fixed regulator in the set of fixed regulators diverts an associated current at different voltages. The variable regulator is capable of being connected to another current source, wherein the variable regulator diverts different amounts of another current from a total amount of current diverted by the set of fixed regulators and the variable regulator changes, wherein undiverted current is passed to a load connected to a bus and wherein the set of fixed regulators and the variable regulator maintain a voltage on the bus within a selected range.

In yet another advantageous embodiment, a method controls a voltage on a bus having a plurality of parallel power sources by shunting excess current away from the bus. A current is received from the plurality of parallel power sources. A portion of the current is shunted away from the bus, depending on control voltage and a value of a total shunt current. One of all current and no current is shunted from other current sources in a plurality of parallel current sources as the control voltage changes.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
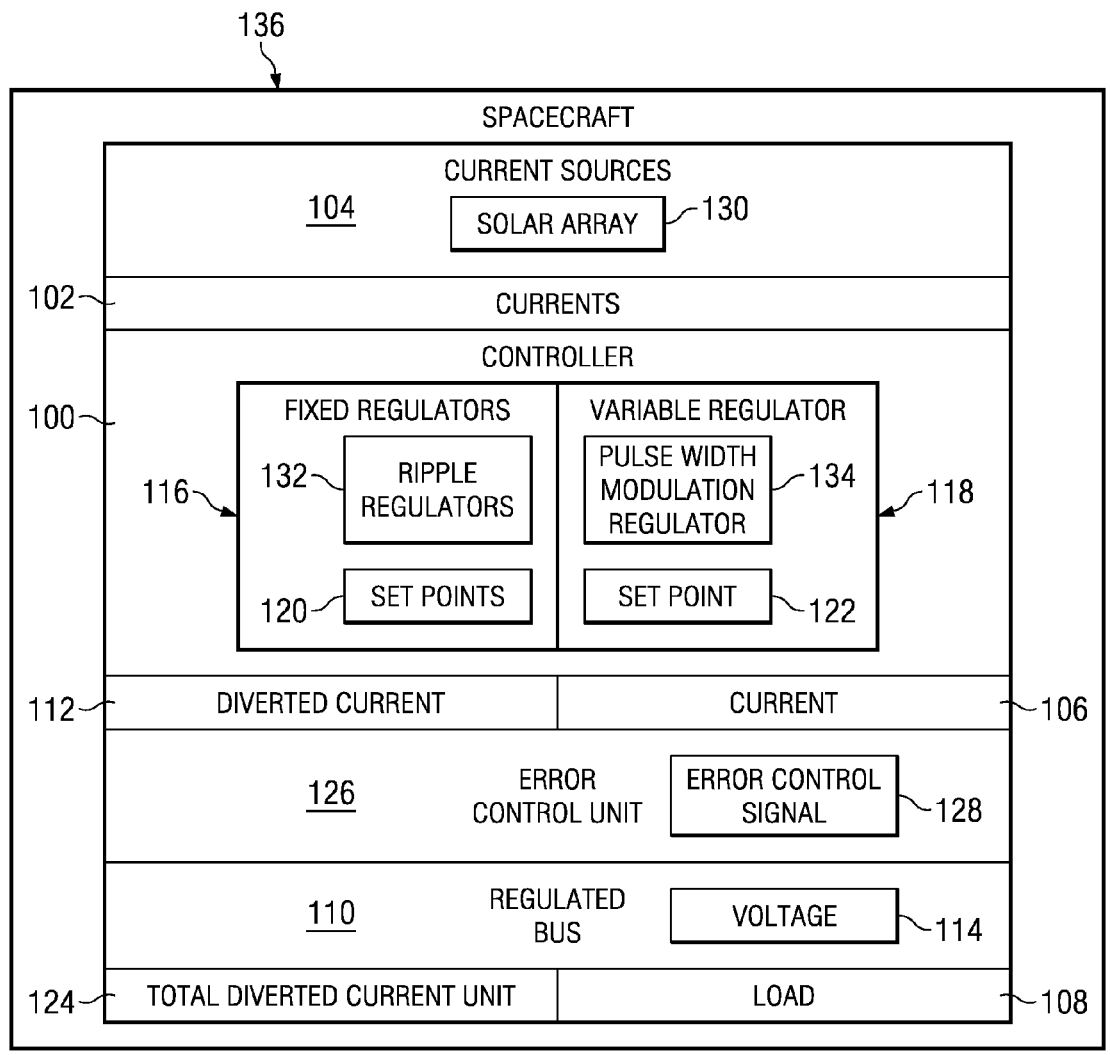
FIG. 1 is a block diagram of a controller used to provide current for a regulated bus in accordance with an advantageous embodiment.

The different advantageous embodiments are particularly suitable for regulating voltage by controlling current from multiple power sources, such as groups of solar circuits. In most cases, the solar array may produce a power that is greater than the load demand. In other words, current changes on a bus may change the bus voltage. One way to regulate the voltage is to shunt excess current by shorting some solar circuits and returning that current to the solar array. The different advantageous embodiments may use pulse width modulated regulators and ripple regulators to control the current. The different advantageous embodiments recognize that pulse width modulated regulators are capable of providing a finer range of control because these types of regulators can pass different amounts of current to the load. Ripple regulators provide a coarser control because the devices either pass all the current to the load or shunt away the current from the load.

The different advantageous embodiments also recognize that most existing controllers use only pulse width modulated regulators to totally pass, partially pass, or totally shunt excess current as needed. The different advantageous embodiments recognize, however, that these types of regulators are complex and heavy. The different advantageous embodiments recognize that in one solution, a pulse width modulated regulator may be used with multiple ripple regulators to provide a lighter weight configuration. The different advantageous embodiments recognize, however, that in existing architectures sensed signals correlated to the bus voltage, as compared to fixed reference voltages in the different regulators. If the sensed voltage is higher than reference voltage, the current is shunted to drive the voltage down to the desired bus voltage level. Since pulse width modulated regulator and ripple regulator have limited current capability, the different advantageous embodiments recognize that a pulse width modulated regulator and a number of ripple regulators are engaged depending on the total current generated by the solar array.

The different advantageous embodiments recognize that the pulse width modulated regulators in some current configurations are configured to have a wide voltage regulation range varying with shunt current that covers the entire range of voltage set points of all the ripple regulators that are used. The pulse width modulated regulator output voltage is higher when current shunting is high and lower when the shunt current is low. The different advantageous embodiments recognize that this type of configuration has a disadvantage because the bus voltage may not be tightly regulated. Also, the pulse width modulated regulator may be modified to widen the regulation range when more ripple regulators are added for a higher power system.

Thus, the different advantageous embodiments provide a method and apparatus for a control circuit using a pulse width modulated regulator and a set of ripple regulators in a manner in which the total shunt current is used to modify the reference voltage of the pulse width modulated regulator. As used herein, the phrase "a set" or "a number" with reference to an item refers to one or more items. For example, a set of ripple regulators is one or more ripple regulators, and a number of set points is one or more set points.

The shunting of the current by the pulse width modulated regulator depends on both the value of a bus voltage and the total value of the shunt current. In the different advantageous embodiments, the reference voltage for the pulse width modulated regulator may be dynamically changed by the amounts of proportional total shunt current.

In other words, the pulse width modulated regulator is not set to regulate or control current for the entire range of ripple regulator set points and is not set to the entire range for which the bus voltage is to be controlled. Instead, the set point for the pulse width modulated regulator may shift or vary depending on the total current that is being diverted.

The pulse width modulated regulator voltage set point varies so it is always between the set of ripple regulators passing current to the bus and the set of ripple regulators shunting current away from the bus. The bus voltage is always regulated at the pulse width modulated regulator voltage set-point. In another word, the pulse width modulated regulator actively regulates the bus voltage. In this manner, modifying the pulse width modulated regulator reference with the total shunted current signal, in the different advantageous embodiments, allows the set point voltage of the pulse width modulated regulator to float or change to the value close to the gap between a ripple regulator that is shunting current and a ripple regulator that is passing current.

In this manner, the different advantageous embodiments may provide the fine control desired by using a pulse width modulated regulator and a coarse control by using ripple regulators. Furthermore, the different advantageous has an error generation circuit which generates an error signal to bring the pulse width modulated regulator to a desired fixed voltage set point.

With reference now to the figures, and in particular with reference to FIG. 1, a block diagram of a controller used to provide current for a regulated bus is depicted in accordance with an advantageous embodiment.

Controller 100 receives current 102 from current sources 104. In these examples, multiple current sources 104 are connected to multiple regulators in controller 100. Controller 100 uses current 102 to pass current 106 to load 108 over regulated bus 110. In supplying current 106 to load 108, some or all of current 102 may be passed in current 106.

If only a portion of currents 102 is passed on as current 106, the portion of current 102 not passed onto load 108 is diverted or shunted away from load 108. This current is referred to as diverted current 112. In these examples, current 106 is supplied to load 108 in an amount to maintain voltage 114 on regulated bus 110 at around a constant level.

The passing, diverting, or shunting of current is managed using fixed regulators 116 and variable regulator 118 in this example. Fixed regulators 116 have set points 120, while variable regulator 118 has set point 122. These set points are used to determine what portion of currents 102 is passed on as current 106 and what portion of currents 102 form diverted current 112. In these illustrative examples, set points 120 and set point 122 are voltages. These set points are local set points based on local voltages relative to these components.

In these illustrative examples, each fixed regulator within fixed regulators 116 is connected to a current source within current sources 104. As a result, each fixed regulator within fixed regulators 116 receives a current within current 102 from a current source within current sources 104. Variable regulator 118 is connected to a current source within current sources 104 and receives a current from a current source in currents 102. Set points 120 are voltage values.

When a voltage for a set point within set points 120 is reached, the fixed regulator within fixed regulators 116 with that set point no longer passes current from currents 102 into current 106. Instead, the current, controlled by the fixed regulator, is shunted to diverted current 112. Each fixed regulator within fixed regulators 116 either passes all the current received into current 106 or diverts or shunts all the current into diverted current 112. In these examples, the voltage compared to the set point is based off of the voltage on regulated bus 110, voltage 114. This voltage may be the same voltage as voltage 114 or may be a proportion of voltage 114. For example, a voltage provided may be used to change the voltage levels for comparison purposes. This voltage is also referred to as a local bus voltage.

In these examples, each fixed regulator within fixed regulators 116 has a different set point from the other fixed regulators in fixed regulators 116. Of course, in some embodiments, one or more fixed regulators may have the same set point, depending on the design or goals. The staggering set points allows for more currents to be sent into diverted current 112 and away from current 106 as voltage 114 in regulated bus 110 rises in a controlled manner or sequentially. Fixed regulators 116 provide for a coarse adjustment in which current is either passed or shunted to load 108. By diverting current away from regulated bus 110, voltage 114 may be maintained at a desired level or range. If voltage 114 drops, less current may be shunted into diverted current 112 and sent into current 106 to cause voltage 114 to rise back to the desired level. The set points are selected such that voltage 114 may be maintained at around some constant or desired value.

Variable regulator 118 may pass all of the current, a portion of the current, or none of the current received by this regulator from currents 102. Set point 122 is a voltage value used to select the proportion or amount of the current that has passed into current 106 and the amount of current that has passed into diverted current 112. For example, if voltage 114 is slightly below the desired voltage range, variable regulator 118 passes all the current received into current 106. If voltage 114 slightly above the desired voltage range, then variable regulator 118 passes none of the current into current 106. Instead, all the current is passed into diverted current 112.

The variable regulator 118 may pass just the right amount of the current into current 106 and divert the remaining current into diverted current 112 to maintain the regulated bus 110 within a desired voltage range.

In these examples, set point 122 is set as the lowest set point but still higher than voltage 114 when the total shunted current is zero. In other words, set point 122 has a lower value than any of the set points in set points 120. Set points 120 are staggered at increasing voltage levels higher than voltage 122 and 114. The staggering may be equal or unequal depending on the particular implementation. Of course, some of the set points within set points 120 may be equal to each other depending on the particular design. In these examples, set point 122 may be variable or changed depending on the total amount of diverted current 112. Set point 122 is also referred to as a variable set point. Set points 120 are not affected by the total amount of diverted current in these examples.

Total diverted current unit 124 detects the total amount of diverted current 112 and causes set point 122 to shift based on the total amount of diverted current. In these examples, as the total amount of diverted current increases, set point 122 increases. As the total amount of diverted current 112 decreases, set point 122 also may be decreased. In this manner, as the total amount of diverted current increases, the set point for variable regulator 118 also may increase.

At some point, set point 122 may change to have the same value as a set point within set points 120. When the voltage on regulated bus 110 reaches a set point, the fixed regulator in fixed regulators 116 with that set point will add current to diverted current 112 instead of passing the current as part of current 106. This shunting of current causes the total amount of diverted current 112 to increase. As a result, set point 122 also increases. In this manner, variable regulator 118 may provide the proportional diversion in supplying the current at a higher set point per voltage level.

In the different illustrative examples, set point 122 shifts such that variable regulator 118 may divert current proportionally. As the amount of current increases, at some point, set point 122 reaches or overlaps another set point within set points 120. When that set point within set points 120 is reached, a fixed regulator then shunts all of the current from current 106 into diverted current 112.

As a result, variable regulator 118 diverts less current (same amount of shunt current from set points 120) into diverted current 112 and supplies more current into current 106.

In other words, set point 122 for variable regular 118 floats in a manner such that set point 122 moves set points in between set points 120. This movement of set point 122 is such that set point 122 may float or move between a set point within set points 120 for a fixed regulator within fixed regulators 116 that is passing current and a set point within set points 120 for a fixed regulator within fixed regulator 116 that is shunting current. Further, in these examples set points 120 are selected in a manner that fixed regulators 116 shunt current in a sequential load or order instead of a random order.

In the advantageous embodiments, current sources 104 may take the form of solar arrays 130. Of course, other current sources may be used depending on the particular implementation. Further, current sources 104 may be heterogeneous or different types of current sources. Another example of a source that may be used to implement current sources 104 is a bench power supply, a generator, or some other suitable current source.

In the different advantageous embodiments, fixed regulators 116 may be implemented using ripple regulators 132. A ripple regulator is a voltage regulator that maintains its output voltage within a hysteresis band centered around a fixed voltage. In these different advantageous embodiments, the ripple regulator functions as a voltage regulator that passes current from a solar array when the voltage is below the hysteresis band. This ripple regulator shunts or diverts the current from the voltage above the hysteresis band to maintain bus regulation. Variable regulator 118 may be implemented using pulse width modulated regulator 134. Pulse width modulated regulator 134 is a power regulator which controls the power delivered to a load by varying its ON/OFF duty cycle using a feedback control signal. In these examples, the output voltage may be averaged by an output filter to obtain a regulated direct current voltage. Of course, other types of regulators may be used depending on the particular implementation.

In these illustrative examples, ripple regulators 132 have lower cost and weight as compared to pulse width modulated regulator 134. This type of configuration is especially useful in vehicles, devices, and other suitable systems in which weight and expense are important factors. For example, the different components illustrated are located in spacecraft 136, which may be a satellite. Load 108 may take various forms. For example, load 108 may be a computer, a communications unit, a telemetry subsystem, a thermal control system, and/or any other device or load requiring power.

In these illustrative examples, error control unit 126 generates error control signal 128. This signal may also be referred to just as a control signal. Error control signal 128 is used to adjust set points 120 and set point 122. In these examples, if error control signal 128 is positive, all of these set points are shifted up. If error control signal 128 is negative, then all of these set points are shifted down. Error control unit 126 provides the capability to adjust set point 122 for pulse width modulated regulator 134 and set points 120 for ripple regulators 132. As the bus voltage is actively regulated by pulse width modulated regulator 134, error control signal 128 is responsible for bringing the variable set point of the pulse width modulated regulator 134 to a desired fixed bus voltage set point, regardless of the total shunted current. Error control signal 128 also adjusts the set points 120. However, the ripple regulators with set points in set points 120 above the pulse width modulated regulator set point still passing current and the ripple regulators with set points within set points 120 below the pulse width modulated regulator 134 set point still shunting current.

Thus, the advantageous embodiments provide a method and apparatus for controlling power supplied to a bus. A current controller comprises a set of ripple regulators, a pulse width modulated regulator, and an error amplifier circuit. A set as used herein refers to one or more item. The set of ripple regulators are capable of receiving a set of currents from a set of current sources and passing all the current formed from the set of currents to the bus, or totally shunting current to return back to the current source.

In one example, each of the set of ripple regulators receives an associated current from the set of currents and has a different voltage set point at which the associated current is diverted from the bus, thus allowing sequential shunting of current. The pulse width modulated regulator is capable of receiving a current from another current source and passing all the current from the another current source to the bus, shunting some of the current back to the current source or shunting all the current back to the current source.

The pulse width modulated regulator may have the lowest voltage set point in the current controller when shunted current is zero, and increases its voltage set-point by an amount proportional to the total shunted current, thus allowing the pulse width modulated regulator to "float" to the gap between the ripple regulator in passing mode and the ripple regulator in shunting mode to finely regulate the solar array current The error amplifier circuit senses the power bus voltage and generates an error control signal to the pulse width modulated regulator and the ripple regulators to regulate the power bus at a fixed voltage set-point.

Figure 2:
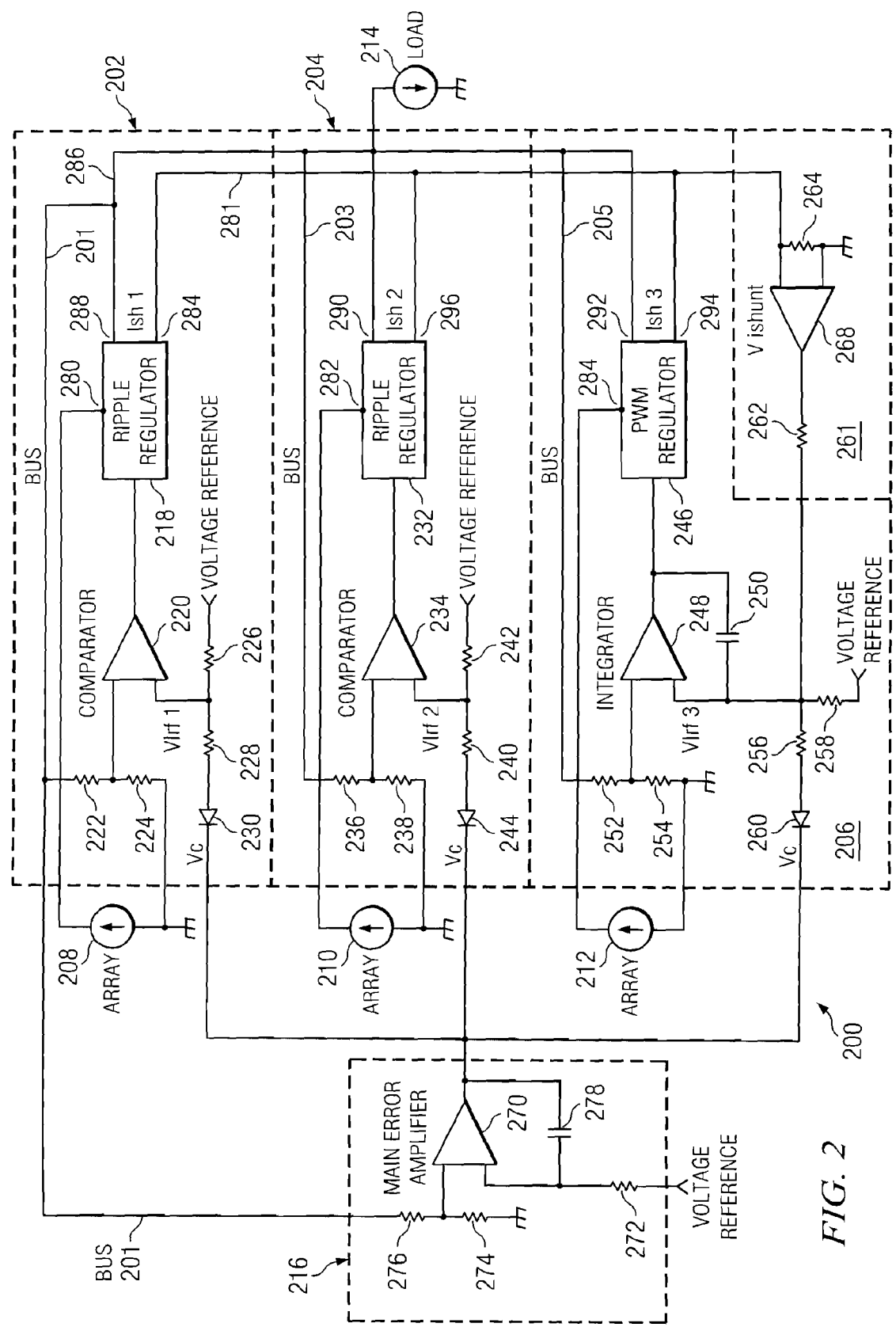
FIG. 2 is a diagram of a solar array controller in accordance with an advantageous embodiment.

With reference now to FIG. 2, a diagram of a solar array controller is depicted in accordance with an advantageous embodiment. In this example, controller 200 is an example of a controller that may be used to control currents received from solar arrays. In particular, controller 200 is an illustrative example of one implementation of controller 100 in FIG. 1.

Controller 200 contains control sections 202, 204, and 206. Each of these control sections is associated with a current source from a solar array. In this example, control section 202 receives current from current source 208, control section 204 receives current from current source 210, and control section 206 receives current from current source 212. These control sections control the load current which is supplied to a load. This load may be any device, computer, electrical system, or other component that requires power.

Controller 200 also includes error signal section 216. This section in controller 200 provides an error signal used to adjust the set points for control sections 202, 204, and 206. This error signal adjusts the set points for each of these control sections by the same amount.

Control section 202 contains ripple regulator 218, comparator 220, resistor 222, resistor 224, resistor 226, resistor 228, and diode 230. Control section 204 contains ripple regulator 232, comparator 234, resistor 236, resistor 238, resistor 240, resistor 242, and diode 244. Control section 206 contains pulse width modulated regulator 246, integrator 248, compositor 250, resistor 252, resistor 254, resistor 256, resistor 258, and diode 260. Section 261 generates a total shunt current and contains resistor 262, resistor 264, and amplifier 268. Error signal section 216 includes amplifier 270, resistor 272, resistor 274, resistor 276, and capacitor 278.

In these examples, ripple regulator 218 receives current from current source 208 at input 280. Ripple regulator 232 receives current from current source 212 at input 282. Pulse width modulated regulator 246 receives current from current source 214 at input 284. More specifically, ripple regulator 218 may pass current onto bus 286 from output 288. Ripple regulator 232 may pass current onto bus 286 from output 290. In a similar fashion, pulse width modulated regulator 246 may supply current onto bus 286 from output 292.

Current not passed to bus 286 from the current sources is diverted to form a diverted current. Diverted or shunted current is output by ripple regulator 218 at output 284. Ripple regulator 232 outputs any shunted current at output 296. Pulse width modulated regulator 246 outputs any shunted current at output 292. These currents are diverted onto shunt line 281.

In these examples, ripple regulator 218, ripple regulator 232, and pulse width modulated regular 246 may pass current onto bus 286, which is also referred to as a regulated bus in these examples. Current source 214 is passed by bus 286 to a load and may receive current from one of these sources.

Further, ripple regulator 218 has local bus 201, ripple regulator 232 has local bus 203, and pulse width modulated regulator 246 has local bus 205. These local buses provide a feedback voltage based off the voltage on buss 286 to comparators 220, 234, and integrator 248, respectively. This feedback is used by the comparators to determine whether to direct current into bus 286 or to divert or shunt current away from bus 286 from the different current sources.

In particular, these currents are sent through a voltage divider formed by resistors 224, and 222 for comparator 220; resistors 236 and 238 for comparator 234; and resistors 252 and 254 for integrator 248. The voltages generated by the voltage dividers are compared to set points set for each of the different regulators to selectively shunt or supply current.

Ripple regulator 218 and ripple regular 232 each have a set point. In these examples, a set point is a voltage at which a ripple regulator will begin diverting current from a load. In these examples, the set points are set in sequential increments. For example, ripple regulator 232 may have one voltage per set point while ripple regulator 218 may have a second set point voltage that is higher than that for ripple regulator 232. Additional ripple regulators may be included in controller 200. Each of those ripple regulators would have successively higher set points in these examples.

In these examples, comparator 220 compares the voltage of local bus 201 with voltage vlrf1. Comparator 234 makes a similar comparison with the voltage of local bus 203 and the voltage of vlrf2. If the voltage of the local bus is higher than that of the local reference voltage, the ripple regulator will shunt or direct all of the current being supplied from the array away from the load and will not contribute to current source 214. If the voltage of the local bus is lower than the local reference voltage, the ripple regulator passes all of the current from the solar array to bus 286.

In these examples, the voltage on the local bus is obtained from the voltage of bus 286. This voltage is not the same voltage, but a proportion of the voltage on bus 286. The voltage divider formed by resistor 222 and 224 and the voltage divider formed by resistor 236 and 238 generate a local bus voltage for bus 201 and bus 203 in these examples.

For example, if the voltage of local bus 201 is greater than local reference voltage vlrf1, all of current source 208 from the array will be passed on to bus 286. If the voltage of local bus 201 is not greater than the local reference voltage vlrf1, ripple regulator 218 directs current away from bus 286 through shunt line 281. In these examples, the set points do not change as the total amount of current shunted or diverted changes for ripple regulator 218, ripple regulator 232. Pulse width modulated regulator 246 has a set point that may change by an amount proportional to the total amount of shunted current generated by amplifier 268. Error amplifier 270 may shift all of the set points through an error signal, voltage Vc. This change is the same offset for all the set points in these examples.

In these illustrative examples, the set point for pulse width modulated regulator 246 is set as being the lowest voltage with respect to other regulators in controller 200. Integrator 248 senses the voltage of local bus 205 through a resistor divider formed using resistor 252 and resistor 254. The output of integrator 248 is used by pulse width modulated regulator 246 to determine how much current to pass and how much current to divert from current source 212. The voltage on local bus 205 is a proportion of the voltage on bus 286 in these examples. In these depicted examples, the feedback from local bus 205 is forced to be equal to the local reference voltage vlrf3 by modulating the duty cycle modulated to regulate bus 286.

In these examples, the shunt current I is shunt output from amplifier 268 originates from currents output by ripple regulator 218, ripple regulator 232, and pulse width modulated regulator 246 onto shunt line 281.

The voltage of the current I shunt generated by amplifier 268 is always positive. This voltage may raise the local reference voltage vlrf3 to a higher level as the voltage of current I shunt increases.

Amplifier 270 generates an error control signal having voltage Vc. This signal is always negative in these examples. Local reference voltages vlrf1, vlrf2, and vlrf3 become lower as the voltage of Vc increases. Decreasing vlrf1 and vlrf2 reduces the set points for the ripple regulators. Voltage Vc provides an offset to the local bus set point to allow a ripple regulator to shunt current away if the voltage of the local bus is higher than its local set point.

In other words, the error control signal, voltage Vc, may be used to adjust all of the set points for the ripple regulators and the pulse width modulated regulator to provide some adjustments with respect to the voltage on bus 286. In these examples, the offset of all the set points are by the same amount. When voltage Vc is negative, all of the set points are adjusted to a lower value.

The depiction of controller 200 is not meant to imply architectural limitations to the manner in which this circuit may be implemented. For example, more or less ripple regulators may be used in controller 200. In other advantageous embodiments, 1, 3, 5, 6, or some other suitable number of ripple regulators may be present. The number of ripple regulators may be selected based on the number of arrays from which current is received by controller 200.

As another example, in other advantageous embodiments, two or more pulse width modulated regulators may be present in addition to other ripple regulators. Further, other types of connections or architectures may be used with respect to these regulators to provide different set points at which a regulator shunts current.

In one example configuration of controller 200, current source 212 is 10 an amps current, current 210 is an 8 amps current, and current 208 is an 8 amps current. The local bus voltage set point for pulse width modulated regulator 246 is set to around 101 volts. Ripple regulator 232 has a set point to 102 volts, and ripple regulator 218 has a set point voltage of around 103 volts. The voltage of bus 286 is set to around 100 volts.

With this example, as the total shunt current along shunt line 281 increases from around 0 amps to around 8 amps, and pulse width modulated regulator 246 modulates or changes the duty cycle from around 0 percent to around 80 percent to shunt current source 212. In other words, about 80 percent of current source 212 is shunted or directed away from bus 286 through shunt line 281, while 20 percent of current source 212 is sent to bus 286.

At this point, voltage Vc from amplifier 270 increases in a negative direction and forces the set point for pulse width modulated regulator 246 to regulate the bus at 100 volts. When the total shunt current output by amplifier 268 increases to around 8 amps, the local set point for pulse width modulated regulator 246 is close to the voltage for the set point of ripple regulator 232 which is around 102 volts in this example.

As current I shunt output by amplifier 268 increases to around 9 amps, the voltage of current I shunt raises the local set point of pulse width modulated regulator by raising voltage vlrf3. At this time, the local set point for pulse width modulated regulator 246 is higher than that for ripple regulator 232. Voltage Vc also increases and forces ripple regulator 232 to shunt current source 210. As a result of ripple regulator 232 shunting current from current source 210, pulse width modulated regulator 246 only needs to modulate or shunt about 10 percent of current from current source 212 to regulate the bus at around 100 volts.

As the shunt current on bus 286 increases to around 17 A, the voltage of current I shunt raises the set point for pulse width modulated regulator 246 to a voltage that is higher than the set point of ripple regulator 218. Voltage Vc from amplifier 270 continues to increase and cause ripple regulator 218 to shunt current from current source 208 away from bus 286. At this point, pulse width modulated regulator 246 only needs to modulate the duty cycle at around 10 percent to partially shunt away current from current source 212 to regulate bus 286 at 100 volts. In this manner, bus 286 is regulated or maintained at around 100 volts. In this manner, controller 200 shifts the set points for pulse width modulated regulator 246.

Figure 3:
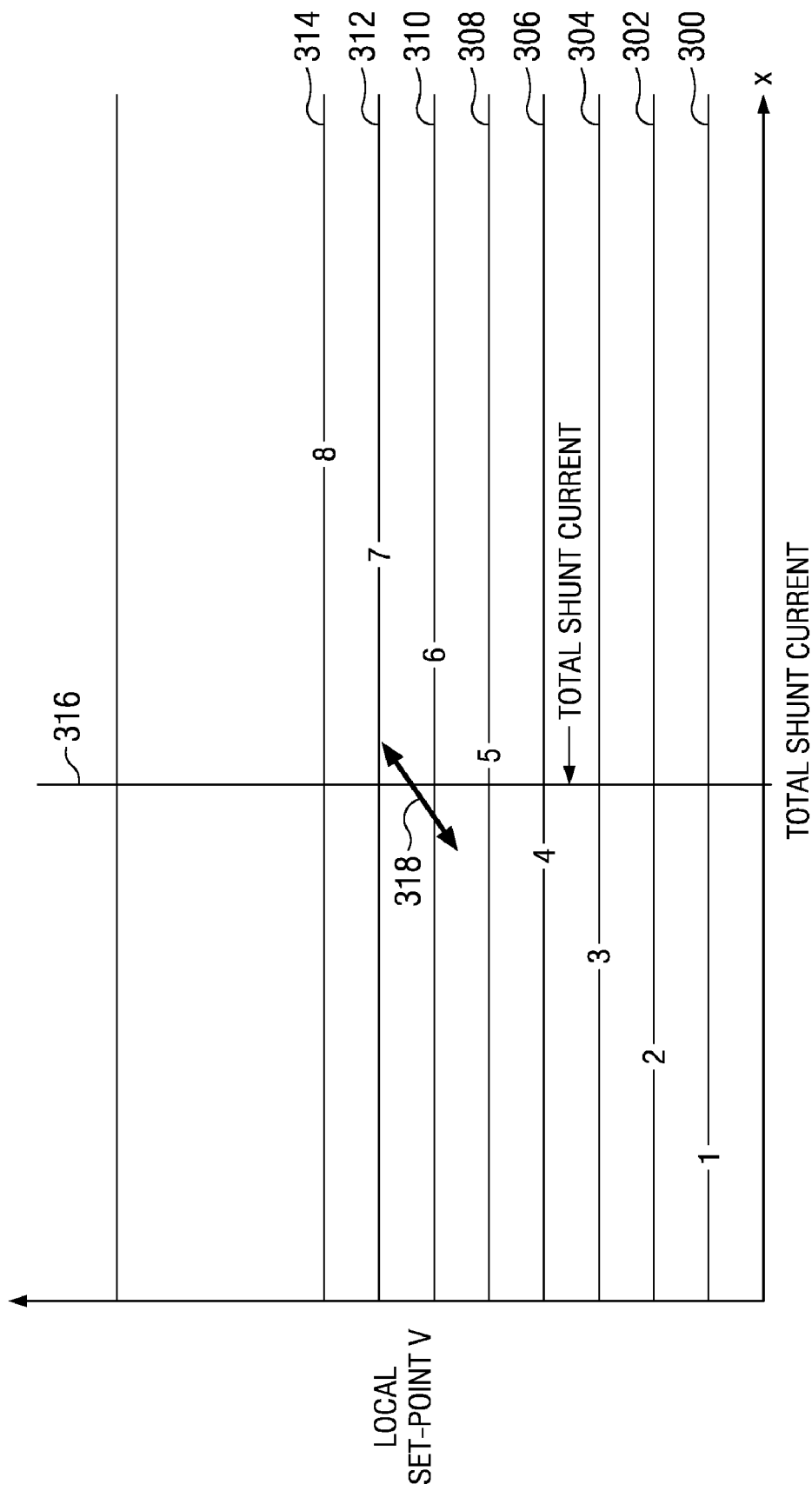
FIG. 3 is a diagram illustrating the changing of set points for a pulse width modulated regulator in accordance with an advantageous embodiment.

With reference now to FIG. 3, a diagram illustrating the changing of set points for a pulse width modulated regulator is depicted in accordance with an advantageous embodiment. In this example, the x axis identifies the total shunt current. This total shunt current may be the current output by amplifier 268 in FIG. 2. The y axis represents the voltages for set points. In these examples, lines 300, 302, 304, 306, 308, 310, 312, and 314 represent local set point voltages for eight different ripple regulators.

In this particular example, at a total current being diverted or shunted at point 316, six ripple regulators are shunting or diverting current, while the seventh and eighth ripple regulators are passing current to the bus. This illustration shows that the pulse width modulated regulator actively regulates the local set point voltage between ripple regulators 6 and 7 as indicated by arrows 318. As can be seen, the ripple regulator local set points do not change as the total shunt current changes, while the pulse width modulated regulator local set point changes with the total shunt current.

Figure 4:
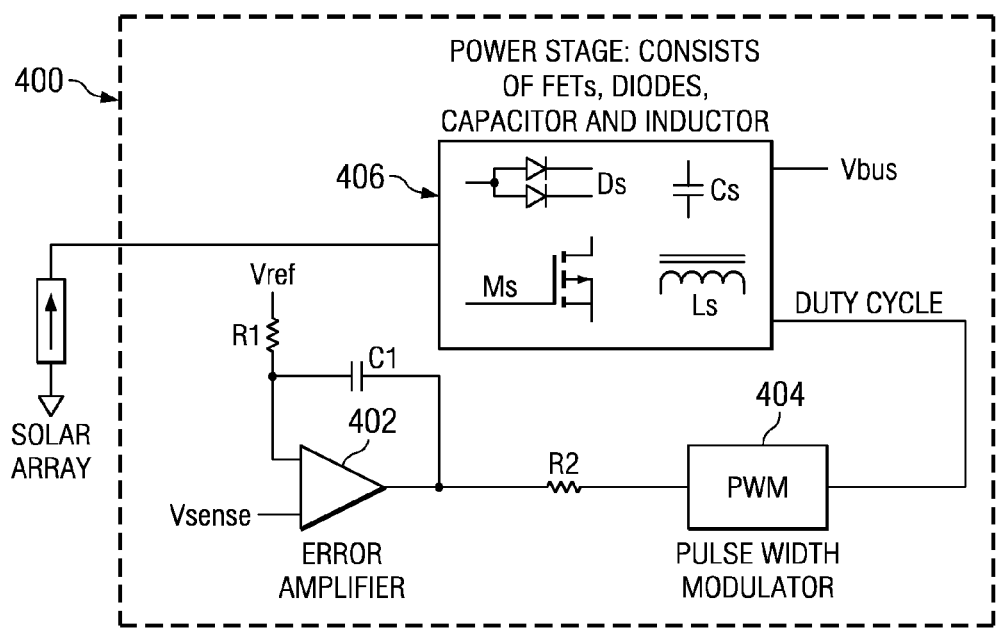
FIG. 4 is a schematic block diagram of a pulse width modulated regulator in accordance with an advantageous embodiment.

With reference now to FIG. 4, a schematic block diagram of a pulse width modulated regulator is depicted in accordance with an advantageous embodiment. In this example, pulse width modulated regulator 400 is an example of a circuit that may be used to implement pulse width modulated regulator 246 in FIG. 2. In this example, power stage 406 in pulse width modulated regulator 400 includes metal oxide field effect transistors (MOSFETs) Ms, diodes Ds, capacitors Cs and inductors Ls.

Circuit 400 also includes resistors R1 and R2. As illustrated, circuit 400 has error amp 402 and integrator capacitor C1, and pulse width modulator 404.

Figure 5:
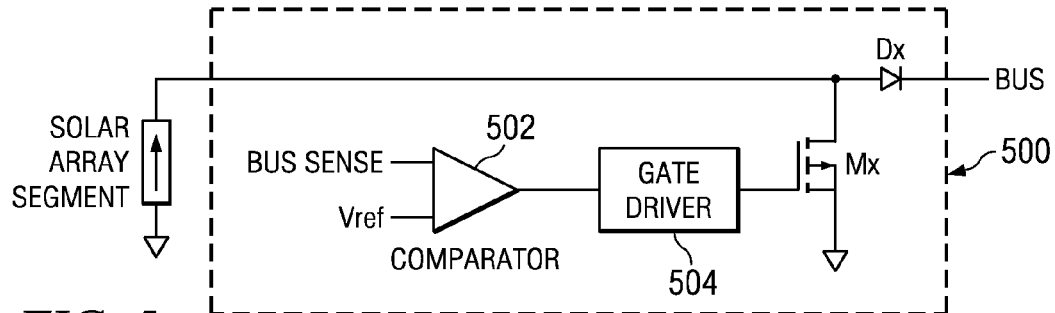
FIG. 5 is a schematic block diagram of a ripple regulator in accordance with an advantageous embodiment.

With reference to now to FIG. 5, a schematic block diagram of a ripple regulator is depicted in accordance with an advantageous embodiment. Ripple regulator 500 may be used to implement ripple regulators 218 and 232 in FIG. 2.

In this example, ripple regulator 500 includes metal oxide field effect transistor (MOSFET) Mx, diode Dx. Additionally, ripple regulator 500 also includes error amplifier 502, and gate driver 504.

The schematic block diagrams for pulse width modulated regulator 400 and ripple regulator 500 are provided as illustrative examples of one implementation of these types of components. The illustrations are not meant to imply architectural limitations as to how or what circuits may be used to implement a pulse width modulated regulator and a ripple regulator.

Figure 6:
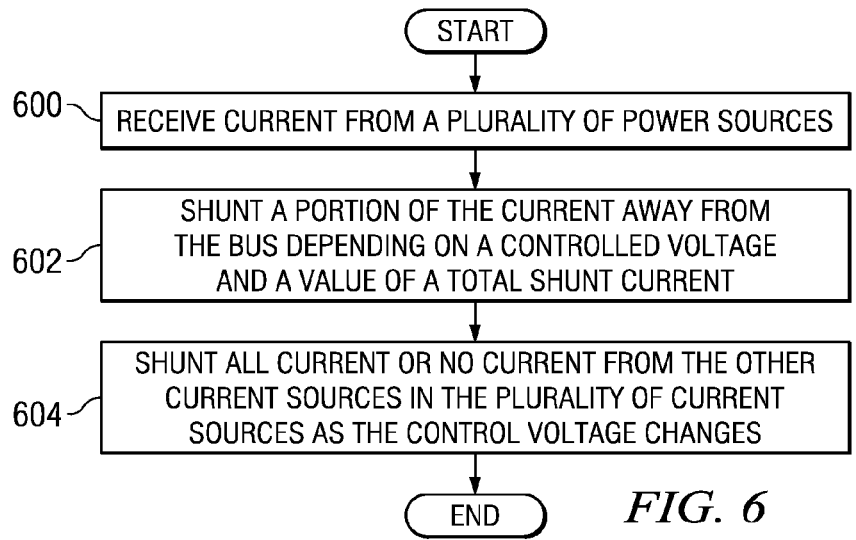
FIG. 6 is a flowchart of a process for controlling currents sent onto a bus in accordance with an advantageous embodiment.

With reference next to FIG. 6, a flowchart of a process for controlling currents sent onto a bus is depicted in accordance with an advantageous embodiment. In this example, the current is received from a number of different current sources and selectively sent onto a bus for use. The process illustrated in this figure may be implemented using a controller, such as controller 200 in FIG. 2.

The process begins by receiving current from a plurality of power sources (operation 600). In operation 600, each regulator in a control circuit receives current from a power source. In the different advantageous embodiments, a pulse width modulated regulator receives current from one power source while the remaining regulators are ripple regulators that receive currents from other power sources in the plurality of power sources.

The process shunts a portion of the current away from the bus depending on a controlled voltage and a value of a total shunt current (operation 602). In operation 602, a pulse width modulated regulator may shunt different proportions of the current being received by this regulator depending on the control voltage value and the value of the shunt current.

As the total shunt current increases, the local reference voltage for the pulse width modulated regulator also increases. As a result, the amount of current passed by the regulator may increase. This increase may occur until a ripple regulator starts diverting current. When the ripple regulator starts diverting current, the total amount of current increases such that the pulse width modulator will reduce the amount of current being diverted such that the total shunt current remains the same.

The process then shunts all of the current or no current from other current sources in the plurality of current sources as the control voltage changes (operation 604), with the process terminating thereafter. Operation 604 is performed by using ripple regulators in these examples. Although the steps are shown as basically being sequential, operations 600, 602, and 604 may all occur at the same time.

Thus, the different advantageous embodiments provide a method and apparatus for controlling voltage on a bus. The different advantageous embodiments control the amount of current supplied to the bus by selectively shunting and supplying current to the bus. In the different advantageous embodiments, a number of fixed regulators are used with a variable regulator. This number of fixed regulators may be one or more regulators. The fixed regulators have set points such that they each shunt current at different voltages. These set points are fixed such that they always have the same value no matter what current is being shunted or passed.

The variable regulator in these examples is a pulse width modulated regulator that proportionally or variably outputs current and diverts current at the same time. The set point of a pulse width modulated regulator may be varied such that this set point increases as the total amount of current being diverted also increases. As a result, the variable regulator diverts current based on a local bus voltage and a total amount of current being diverted.

With the different advantageous embodiments, ripple regulators may be used with a single pulse width modulated regulator that provides regulation of a bus that is more uniformed than current architecture is using at pulse width modulated regulators with a set of ripple regulators. In this manner, desired bus regulation may be achieved with less complex circuits. This lower complexity reduces weight and costs in designing and implementing control circuits.

For example, four ripple regulators may be packaged into one module versus only two pulse width modulated regulators in the same size power module. Further, a pulse width modulated regulator is typically twice as heavy as a ripple regulator. As can be seen, size and weight reductions may be obtained through architecture and configuration of the different advantageous embodiments. The variation in the set point of the pulse width modulated regulator allows for this to actively regulate the power bus at all times as opposed to currently used systems that employ all pulse width modulated regulators.

The description of the different advantageous embodiments has been presented for purposes of illustration and description, and is not intended to be exhaustive or limited to the embodiments in the form disclosed. Many modifications and variations will be apparent to those of ordinary skill in the art.

Although the different illustrative embodiments are directed towards controllers used with solar array and satellites, the different advantageous embodiments may be applied to controllers for other types of vehicles, objects, and other suitable devices. For example, the different advantageous embodiments may be applied to regulating busses supplying current to systems in a vehicle, such as a car or truck. In other advantageous embodiments, the controller architecture illustrated in the different examples may be applied to supplying power to components in a data processing system or in a building.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A current controller comprising:
    a set of ripple regulators capable of receiving current from current sources and supplying a current to a bus, wherein each of the set of ripple regulators has a different set point at which the current is diverted from the bus to form a number of set points;
    a pulse width modulated regulator capable of receiving a current from another current source and passing the current to the bus, wherein the pulse width modulated regulator has a variable set point used to define a portion of a current source that is shunted away from the bus, wherein the current shunted by the set of ripple regulators and the current shunted by the pulse width modulated regulator form a total shunt current, wherein the variable set point varies as the total shunt current varies, and the number of set points do not vary as the total shunt current varies; and an error generation circuit capable of generating an error control signal, wherein the set of fixed set points and the variable set point may be adjusted by the error control signal.

2. The current controller of claim 1, wherein the set of ripple regulators and the pulse width modulated regulator shunt excess current to maintain a selected voltage on the bus.

3. The current controller of claim 1, wherein the error generation circuit comprises:

an amplifier having a first input, a second input, and an output, wherein the first input is connected to a signal proportional to the bus voltage, the second input is connected to a reference signal and the output generates the error control signal.

4. The current controller of claim 1, further comprising:

an amplifier having a first input, a second input, and an output, wherein the first input is connected to a set of outputs from the set of ripple regulators that output a set of shunt currents and the output of the pulse width modulated regulator that outputs another shunt current to form the total shunt current.

5. The current controller of claim 1, wherein the pulse width modulated regulator set point is lower than each of the ripple regulator set points in the number of set points when total shunt current is zero.

6. The current controller of claim 1, wherein the set of ripple regulators are capable of shunting current sequentially with the number of set points being staggered with respect to each other.

7. The current controller of claim 1, wherein the variable set point of the pulse width modulated regulator varies in a manner proportional to the total shunt current.

8. The current controller of claim 1, wherein the error generation circuit is capable of generating the error control signal to adjust the number of set points for the set of ripple regulators and the variable set point of the pulse width modulated regulator regardless of the total shunt current.

9. An apparatus comprising:

a set of fixed regulators capable of being connected to a set of current sources, wherein each fixed regulator in the set of fixed regulators diverts an associated current at different voltages; and a variable regulator capable of being connected to another current source, wherein the variable regulator diverts different amounts of the another current as a total amount of current being diverted by the set of fixed regulators and the variable regulator changes, wherein undiverted current is passed from the set of fixed regulators and the variable regulator to a load connected to a bus and wherein the set of fixed regulators and the variable regulator maintain a voltage on the bus within a selected range.

10. The apparatus of claim 9 further comprising:

an error generation circuit, wherein the error generation circuit sends an error signal to the set of fixed regulators for use in determining whether to divert current from the set of current sources and sends the error signal to the variable regulator for use in determining how much current to divert from the another current source.

11. The apparatus of claim 9, wherein the set of fixed regulators is a set of ripple regulators.

12. The apparatus of claim 9, wherein the variable regulator is a pulse width modulated regulator.

13. The apparatus of claim 9 further comprising:

the set of current sources connected to the set of fixed regulators; and the another current source connected to the variable regulator.

14. The apparatus of claim 9, wherein a set point at which all current is diverted by the variable regulator changes as a total amount of current diverted by the set of fixed regulators and the variable regulator changes.

15. A method for controlling a voltage on a bus having a plurality of parallel power sources by shunting excess current away from the bus, the method comprising:

receiving a current from one of the plurality of parallel power sources;

shunting a portion of the current away from the bus, depending on the voltage on the bus and a value of a total shunt current; and shunting one of all current or no current from other current sources in the plurality of parallel current sources as the voltage changes.

16. The method of claim 15, wherein the step of shunting the portion of the current away from the bus, depending on the control voltage and the value of the total shunt current is performed using a pulse width modulated regulator and wherein the step of shunting one of all current and no current from other current sources in the plurality of current sources as the control voltage changes is performed using a set of ripple regulators.

* * * * *